United States Patent [19]
Driver

[11] Patent Number: 5,234,310
[45] Date of Patent: Aug. 10, 1993

[54] HOIST SYSTEM FOR FLAT BED TRUCKS

[76] Inventor: Wilfred D. Driver, 357 East 28th Street, Hamilton, Ontario, Canada, L8V 3J7

[21] Appl. No.: 810,284

[22] Filed: Dec. 19, 1991

[51] Int. Cl.⁵ ............................................... B60P 1/44
[52] U.S. Cl. ...................................... 414/540; 414/537
[58] Field of Search ............. 414/495, 537, 539, 540, 414/545, 556–558; 14/71.1, 71.3; 187/9 R, 24

[56] References Cited

U.S. PATENT DOCUMENTS

| | | | |
|---|---|---|---|
| 2,405,054 | 7/1946 | Pringle | 414/545 |
| 2,590,591 | 3/1952 | Winkler | 414/539 |
| 2,837,227 | 6/1958 | Lugash | 414/558 |
| 3,180,503 | 4/1965 | Shaw | 414/540 |
| 3,233,758 | 2/1966 | Darfus | 414/540 |
| 3,545,791 | 12/1970 | Lugash | 414/558 X |
| 3,620,565 | 11/1971 | Eggert, Jr. et al. | 187/24 X |
| 3,737,055 | 6/1973 | Pettit | 414/558 |
| 4,134,504 | 1/1979 | Salas et al. | 414/558 |
| 4,287,967 | 9/1981 | Perkins | 187/24 |
| 4,353,436 | 10/1982 | Rice et al. | 414/540 X |
| 4,711,613 | 12/1987 | Fretwell | 414/558 X |
| 4,836,736 | 6/1989 | Neagu | 414/558 X |
| 4,909,700 | 3/1990 | Fontecchio et al. | 414/558 X |
| 4,958,979 | 9/1990 | Svensson | 414/558 X |
| 5,007,794 | 4/1991 | Lombard | 414/558 X |
| 5,080,200 | 1/1992 | Gibson | 187/24 |

*Primary Examiner*—David A. Bucci
*Attorney, Agent, or Firm*—Laurence R. Brown

[57] ABSTRACT

An improved system is provided for hoisting loads from ground level to a truck platform, which has particular advantages on flat bed trucks. Ramps are provided for rolling loaded dollies off a curbing or from the ground onto a lower lift platform position where they are raised by a motor powered hoisting mechanism with the lift platform up to the truck platform. The system is stowed and carried entirely beneath the truck platform so that it does not interfere with its utility or introduce any members above the truck platform. A pivotable lift platform permits storage in a vertically oriented position to prevent the system from extending significantly back of the truck platform. A low powered d-c reversible motor rotates vertical drive screws mating with a drive yoke attached to opposite ends of the lift platform. The lift platform is spring biassed upwardly to aid in lifting loads upwardly to the truck platform with a small motor. A bumper assembly is carried by the system for mounting, license, trailer hitch, lights, etc. Also loading tray extensions are strapped in the lift platform for optional use. The bottom of the lift platform assembly is above ground level and cooperates with a self contained loading ramp which extends to ground or curb level from sides or rear of the lift platform permitting loaded wheeled dollies to be rolled on and lifted to the truck platform.

10 Claims, 2 Drawing Sheets

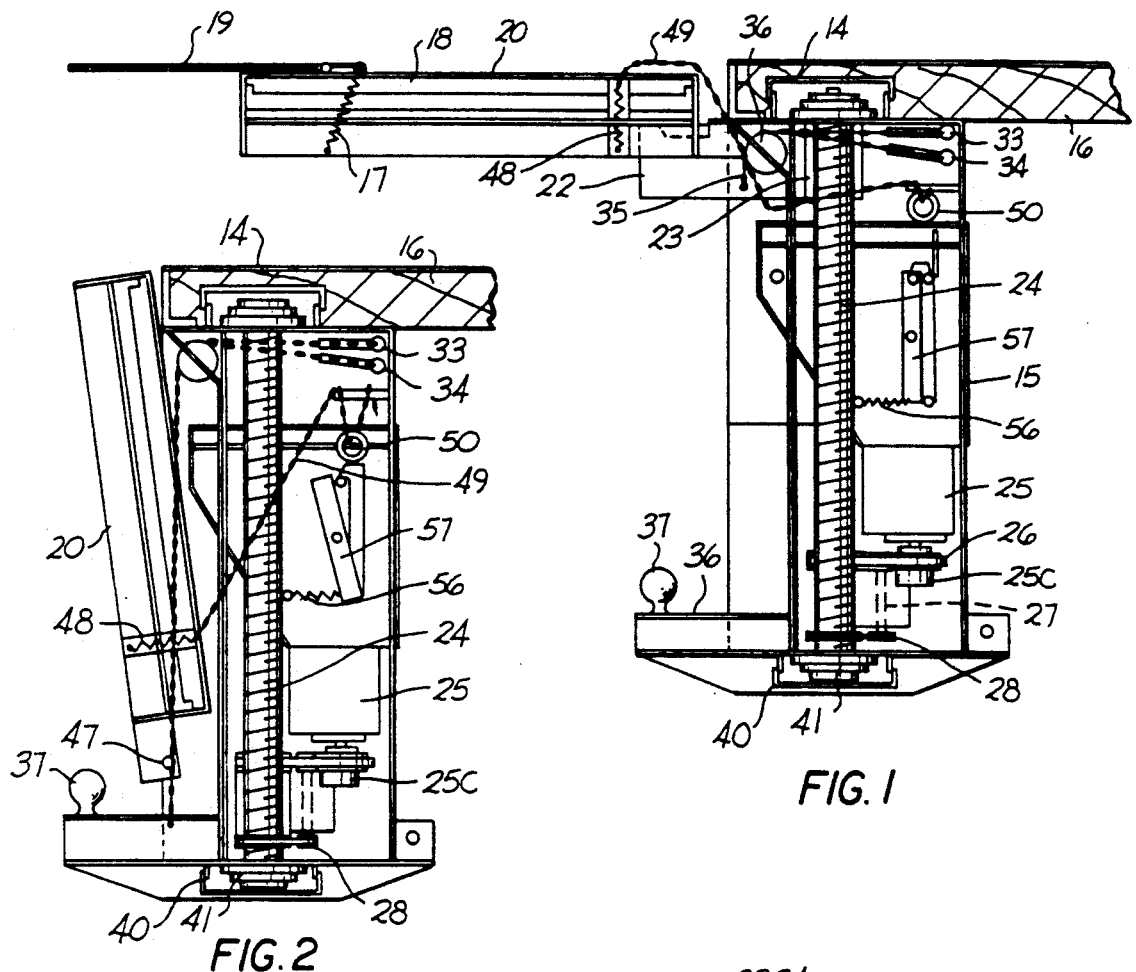
FIG. 1
FIG. 2
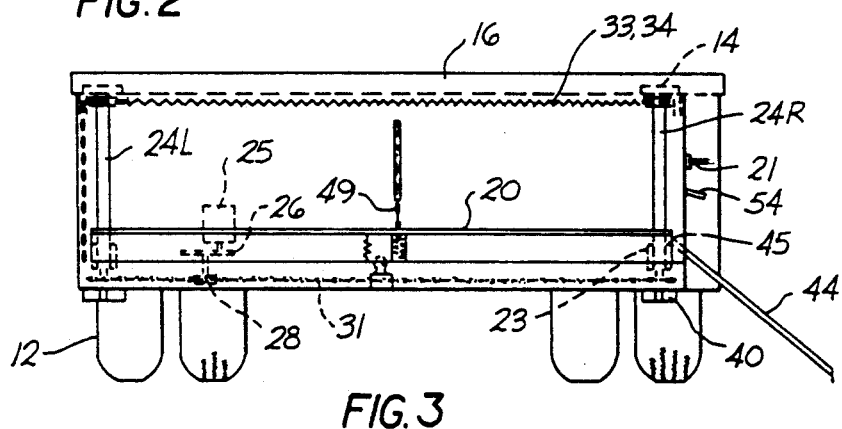
FIG. 3
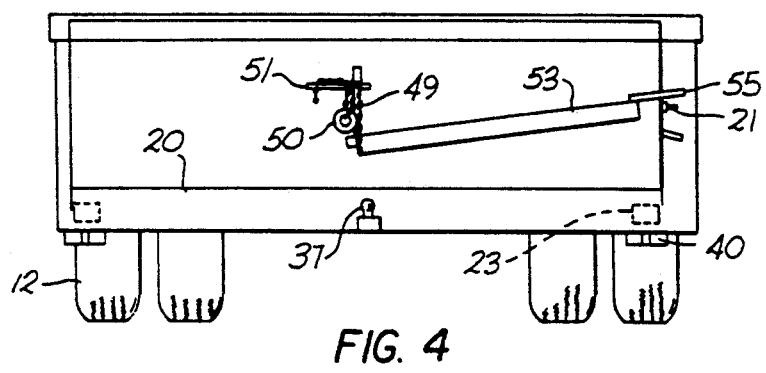
FIG. 4

5,234,310

HOIST SYSTEM FOR FLAT BED TRUCKS

TECHNICAL FIELD

This invention relates to lifts or hoists for raising loads from ground level to a truck platform, and more particularly it relates to self contained systems readily stored on and carried by trucks for use when necessary.

BACKGROUND ART

For loading furniture into trucks, for example, there are several conventional procedures. Manual lifting from the ground is dangerous and tiring. Alternatively, a long ramp leading from ground level to the truck platform is used to permit loaded wheeled dollies to be rolled up the incline and onto the truck. That has the disadvantages of requiring manual moving of a heavy load from ground level to truck platform level and restriction of use to places that the long ramps can be positioned. Shorter and steeper ramps are more dangerous and require greater maximum manual force. Accordingly motorized lift platforms have been suggested for reducing the manual effort necessary to move loads between ground levels and the truck platforms. These motorized lift platforms however have not been entirely successful and have various deficiencies.

In general, lift platforms are expensive, difficult to install- often requiring extensive modifications to standard truck construction- and impose obstructions to truck design or accessibility, including those requiring more room and extending truck body length or height, or those introducing dangers in operation or in storage. Some explicit examples of prior art motorized lifts and hoists disclosed in U. S. Patents follow.

Lift platforms with hydraulic mechanisms require expensive and complicated mechanisms for moving loads both laterally and vertically and a source of hydraulic power, as evidenced by 3,233,758, J. M. Darfus, Feb. 8, 1966 for Lift Gate. Also the support of such elevating mechanisms require high superstructure extending far above the truck platform and appropriate truck construction for anchoring at both bottom and top ends. Nor are these sorts of elevators easy to store without interference or modification of equipment.

An electric motor is used with expensive worm drive and rack pinion assembly for vertical movement in 2,405,054, O. R. Pringle, Jul. 30, 1946 for Elevating End Gate. This requires a heavy motor that quickly drains the conventional truck battery and significant modification to usual truck framework.

The motorized winch system of 2,590,591, H. E. Winkler for Adjustable Tail Gate Lift Assembly, Mar. 25, 1952 also requires an expensive winch and motor drive mounted below the truck platform and a twin tower hoist mechanism mounted on the platform to interfere with loading space.

Because of difficulties in storing a lift elevator system on board the truck, 3,180,503, F. J. Shaw, Apr. 27, 1965 for Detachable Tail Gate Lift for a Truck discloses a non-motorized assembly that can be hooked onto a pivot rod added to the truck frame and supported against a bumper. The load platform alternatively can be pivoted when not in use into the truck body to replace a conventional tail gate. The load is elevated by means of two lift screws manually rotated by a wrench. Operation is slow and tedious, and the platform may become dislodged because it is not secured in place when handling loads.

This sort of prior art introduced other problems and deficiencies and fails to solve some urgent problems. For example, prior art devices are not suitable for use on flat body trucks, with or without side stakes. Furthermore the cost and inconvenience of custom installation and changes in body work or frame design is prohibitive. Nor has the prior art adequately dealt with problems of interfacing with the ground or equivalent support surfaces. Thus, unstable or tilted platform system ground contact in the presence of heavy loads is dangerous and intolerable. Another problem is the interfacing of loads initially on the platform. One example is that prior art elevator platforms are disposed so that loads such as heavy furniture, etc. may have to be manually transferred from a wheeled dolly to the load lift platform, and then manually moved or replaced on a wheeled dolly for placement in the moving van or on the truck bed.

It is therefore a general object of this invention to provide improved load lift systems and apparatus solving the aforesaid problems and deficiencies of the prior art.

Other objectives, features and advantages of the invention will be found throughout the following description, drawings and claims.

DISCLOSURE OF THE INVENTION

A motorized hoist assembly raises loads up on a movable load bearing platform from ground level to a truck platform for transferring the loads onto the truck. The assembly is contained in a housing that mounts and stores the entire assembly beneath the truck platform, and thus is ideally suited for use with a flat bottom truck which has a platform extending rearwardly from the rear truck wheels. The lift platform pivots between horizontal loading and vertical storage positions and can be latched in storage position. A low powered d-c motor reversibly drives the lift platform upwardly and downwardly and is made possible by sharing peak lift loads with a spring biassed to move the platform upwardly. Thus, the motor overcomes the spring bias when moving the platform downwardly.

Accessories to the primary hoist or elevator assembly include an extension shelf stored in the lift platform for bistable positioning in storage position or outside the lift platform to extend the platform surface area available. Also provisions are made for a ramp stored in the lift platform, permitting loaded wheeled dollies to be moved onto the platform from ground or curb levels. This lift platform ramp permits the lift platform to attain a lowermost position off the ground, thereby eliminating problems of ground to lift interfacing. A built in bumper accessory not necessarily found on flat platform trucks is built into the assembly and supports a trailer hitch, a license plate, lamps and the like.

The motor drives two rotatable screw shafts supporting each end of the platform through a mating nut yoke mechanism. The motor, protected by a slip clutch belt drives a drive shaft for the screw shafts through a pulley-belt drive. The drive shaft is connected to both screw shafts by chain belt drive to assure balance and synchronism.

These and other features will be more explicitly understood by reference to the accompanying drawings.

BRIEF DESCRIPTION OF THE DRAWINGS

In the drawings, wherein like reference characters refer to similar features throughout the several views:

FIG. 1 is a side view sketch, partly in section of a motorized hoist assembly embodiment of the invention installed in place underneath the platform of a flat body truck, with lift platform in its uppermost horizontal position mating with the truck platform, FIG. 2 is a side view sketch, partly in section of the hoist assembly with the lift platform in lowermost position and pivoted substantially vertically for storage, FIG. 3 is a partial rear view of a flat body truck with the hoist assembly shown partially in section with the platform in its lowermost loading position for illustrating the relationship of selected parts, FIG. 4 is a partial rear view of a flat body truck with the hoist assembly shown partly in section for illustrating the relationship of selected parts with the lift platform stored as in FIG. 2.

THE PREFERRED EMBODIMENT

Figure 5:
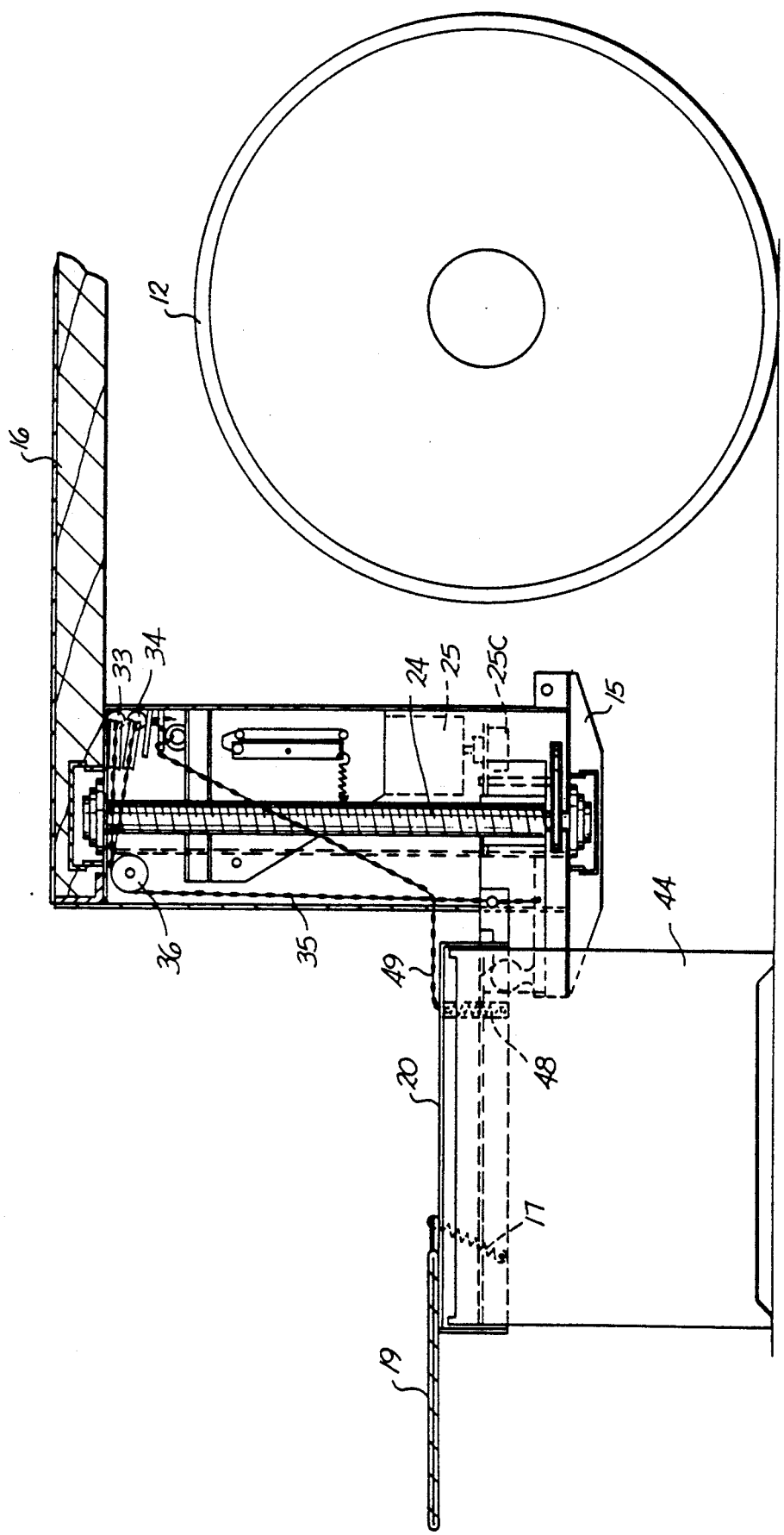
FIG. 5 is an enlarged fragmental side view of the hoist assembly with lift gate in lowermost position corresponding to the rear end view of FIG. 3.

It may be seen from FIGS. 1 and 2 that the housing 15 for the hoist assembly is installed at cap 14 and secured by means of bolts or screws across the width of the truck platform 16 (FIG. 3) to bear the weight of loads to be elevated on lift platform 20. The housing 15 extends completely underneath the upper working surface of platform 16, and thus ideally suits the hoist assembly of this invention for use on a flat bed truck, which generally has its load platform extending rearwardly beyond the rear truck wheels 12. Thus, the housing 15 extends downwardly to a position behind the wheels 12 clearing the ground in both storage and working positions, as best seen in FIGS. 3 and 4. The lift platform 20 at its uppermost position therefore mates with the truck bed platform 16 for transfer of loads between the lift platform 20 and the truck. The lift platform 20 has an internally stored shelf 19, shown in FIG. 1 in extended position, which bistably rests in the external position and in cavity 18 as aided by the retention spring 17.

The lift platform 20 is supported by yoke 22, which terminates in the cylindrical nut portion 23 that mates with the rotatable elevator screw 24. To lower or raise the lift platform 20 the bidirectional d-c motor 25 is actuated in appropriate direction by toggle switch 21 from the truck battery. The drive train from the motor 25 includes an overload slip clutch 25C, belt drive 26, driveshaft 27 and chain drive sprocket 28 coupling two links to separate screws 24L and 24R as seen in FIG. 3. The chain drive links 30, 31 about sprocket 28 assure synchronous drive from both elevator screws 24 and horizontal level position of the lift platform 20.

A small 1/6 horsepower motor 25 may be used, with low battery drain to lift heavy loads because the springs 33, 34, connected by chain 35 and pulley 36 to the lift platform yoke 22 urge the yoke 22 upwardly thereby to decrease the peak motor load required when elevating loads on the platform 20. Thus, the motor 25 stretches the springs 33, 34 to overcome the spring bias when the lift platform is moved downwardly. This feature also gives stability to the movement of loads and reduces wear on the elevator screws 24. Typical spring bias tension is 300 lbs (140 kg).

The rearwardly extending bumper assembly 36 near the bottom of housing 15 permits addition of accessories such as trailer hitch 37, license plate, lamps, etc. The bottom cap 40, which houses journalling 41 for the screw 24, is positioned above the ground level and thus need not find level contour or require site preparation. The ramp 44 is pulled from storage position inside the lift platform 20 at the curbing side preferably, but also from the rear or opposite side if desired, and pivots at 45 to provide an inclined surface for rolling up loaded rubber wheeled dollies such as used in moving furniture or other loads. The ramp may rest upon the curb or extend to the ground or street surface.

As seen best from FIG. 2, the lift platform 20 pivots about shaft 47 between a braced horizontal position for carrying loads and a substantially vertical storage position when the lift platform 20 is in its lowermost position. A spring 48 and chain 49 anchored to plate 51 is shortened by pulling ring 50 downwardly to pivot the platform 20 into its vertical position (FIG. 4). Lever arm 53 operable at the control panel 54 on the curbing side of the assembly is toggled by means of extension 55 to move the latching mechanism 57 held in place normally by bias spring 56, thereby to release ring 50 and let the lift platform pivot back downwardly into its horizontal position. The enlarged view of FIG. 5 shows the various parts and chains in different locations assumed as the lift platform 20 is raised and lowered.

Having therefore described the construction and operation of this preferred embodiment of the improved hoist system and apparatus afforded by this invention, those novel features setting forth the nature and spirit of the invention are defined with particularity in the following claims.

What is claimed is:

1. A motorized hoist assembly movably supported solely on a flat body truck platform for raising loads up to a truck platform extending behind rear truck wheels comprising in combination, a movable load bearing platform, motor controlled hoist means comprising rotatable screw means attached to the truck platform behind the wheels for moving the platform vertically behind the truck body from a lower position near the ground upwardly to a higher position behind the truck platform for transferring a load carried by the movable platform onto the truck platform, and hoist assembly mounting means for pivoting the movable platform in its lowermost position upwardly from a horizontal position to a substantially vertical position to mount and store the entire hoist assembly behind the rear truck wheels in a position entirely beneath an upper working surface of the truck platform.

2. The assembly of claim 1 further comprising spring biasing means disposed for exerting a lift force to said load bearing platform, an electric motor and drive means for coupling the electric motor to the hoist means for exerting power to lower the platform against the spring biasing means and to raise a loaded platform with the assistance of the force of the spring biasing means.

3. The assembly of claim 1 wherein said movable load bearing platform further comprises an extension shelf for the movable platform, receptacle means within the movable load bearing platform for storage of the shelf and wherein said hoist assembly mounting means further comprises a mechanism for holding the shelf in bistable positions respectively stored in the movable platform and extended from the movable platform to provide additional movable platform surface area.

4. The assembly of claim 1 wherein said movable platform further comprises a ramp fitting adapted for operation to extend from the movable platform at a lowermost lift platform position to reach a ground surface contact position whereby a loaded wheeled dolly may be rolled from the ground up the ramp to a resident position on the lift platform, and further comprising means for storing said ramp within said platform for optional removal to extend into position from an edge of the platform to said ground surface contact position ready for use.

5. The assembly of claim 1 wherein said hoist assembly mounting means further comprises pivoting means for pivoting said platform between said horizontal and said substantially vertical positions in response to movement of a chain connected to the movable platform, and means for locking the platform into the vertical position for storage when not in use comprising a lever accessible from a curb side of the truck operable with an accompanying latch assembly for restraining said chain in a taut position holding the platform in its vertical position.

6. The assembly of claim 1 wherein said hoist means further comprises:
  two rotatable screw shafts mounted at two opposite sides of the truck platform and extending over the range of vertical movement of the movable load bearing platform, and two mating lift yoke assemblies attached to the movable load bearing platform having threaded nuts mating with the screw shafts.

7. The assembly of claim 6 further comprising:
  a reversible d-c electric drive motor, a slipping clutch drive mechanism, a belt pulley drive to a first drive shaft carrying a chain drive sprocket, and a chain sprocket drive affixed to rotate both of the screw shafts by way of a chain coupled with the chain drive sprocket.

8. The assembly of claim 6 further comprising means for exerting an upwardly directed force on the platform overcomable by the drive motor when rotating the screws in a direction to lower the lift platform and providing an assisting force to raise a loaded platform when the screws are rotated in the opposite direction by said motor to raise the lift platform.

9. A movable platform load lifting system for lifting loads from ground level upwardly to a truck platform, comprising in combination:
  a movable load lifting platform,
  hoisting means including at least one rotatable screw coupled to said movable platform to move it down towards ground level and up towards the truck platform,
  a d-c reversible electric motor coupled to reversibly drive said screw through a friction clutch and a belt drive pulley mechanism,
  spring biassing means for exerting an upwardly exerted force on the movable load lifting platform, and
  housing means for disposing the entire system below a truck platform upper working surface thereby to prevent obstructing the utility of the truck platform upper working surface.

10. The system of claim 9 wherein said movable load lifting platform further comprises load lifting platform pivoting means for selectively disposing the load lifting platform in a substantially vertical position substantially residing underneath the truck platform for storage and for horizontally extending the movable load lifting platform behind the truck platform for use in lifting objects from ground level up to the truck platform.

* * * * *